US007620852B2

(12) United States Patent
Rodeheffer et al.

(10) Patent No.: US 7,620,852 B2
(45) Date of Patent: Nov. 17, 2009

(54) SYSTEMS AND METHODS OF REPORTING MULTIPLE THREADS INVOLVED IN A POTENTIAL DATA RACE

(75) Inventors: Thomas L. Rodeheffer, Mountain View, CA (US); Yuan Yu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 11/070,693

(22) Filed: Mar. 2, 2005

(65) Prior Publication Data

US 2006/0200823 A1 Sep. 7, 2006

(51) Int. Cl.
*G06F 11/00* (2006.01)

(52) U.S. Cl. ........................................................ 714/42

(58) Field of Classification Search .................. 714/38, 714/48, 42; 718/104
See application file for complete search history.

(56) References Cited

U.S. PATENT DOCUMENTS

| 4,486,831 | A | * | 12/1984 | Wheatley et al. | 718/100 |
|---|---|---|---|---|---|
| 5,590,326 | A | * | 12/1996 | Manabe | 711/150 |
| 5,822,588 | A | * | 10/1998 | Sterling et al. | 717/131 |
| 5,924,122 | A | * | 7/1999 | Cardoza et al. | 711/150 |
| 6,009,269 | A | * | 12/1999 | Burrows et al. | 717/130 |
| 6,167,358 | A | * | 12/2000 | Othmer et al. | 702/188 |
| 6,343,371 | B1 | * | 1/2002 | Flanagan et al. | 717/124 |
| 6,405,326 | B1 | * | 6/2002 | Azagury et al. | 714/38 |
| 6,418,542 | B1 | * | 7/2002 | Yeager | 714/38 |
| 6,593,940 | B1 | * | 7/2003 | Petersen et al. | 715/700 |
| 6,622,155 | B1 | * | 9/2003 | Haddon et al. | 718/100 |
| 6,817,009 | B2 | * | 11/2004 | Flanagan et al. | 717/126 |
| 6,851,075 | B2 | * | 2/2005 | Ur et al. | 714/36 |
| 6,948,092 | B2 | * | 9/2005 | Kondo et al. | 714/12 |
| 2002/0129306 | A1 | * | 9/2002 | Flanagan et al. | 714/100 |
| 2003/0056149 | A1 | * | 3/2003 | Hue | 714/38 |
| 2003/0131283 | A1 | * | 7/2003 | Ur et al. | 714/36 |
| 2005/0283781 | A1 | * | 12/2005 | Karp et al. | 718/100 |

OTHER PUBLICATIONS

Mellor-Crummey, J., "On-the-Fly Detection of Data Races for Programs with Nested Fork-Join Parallelism", *Supercomputing*, 1991, 24-33.

(Continued)

*Primary Examiner*—Robert Beausoliel
*Assistant Examiner*—Amine Riad
(74) *Attorney, Agent, or Firm*—Woodcock Washburn LLP (57) ABSTRACT

Criteria are defined for determining when additional stack dumps would be saved and presented (e.g., to the developer). This provides more information for the developer to use for debugging, and yet does not overburden the developer with irrelevant information. Suspicious activity worthy of an additional stack dumps may be defined as a thread accessing an already suspicious location that is different than the original thread, a write access being made and no write access having yet been made to the target location, or if the lockset being held by the thread accessing the location is omitted from the intersection of all locksets involved in stack dumps for the location.

20 Claims, 12 Drawing Sheets

OTHER PUBLICATIONS

Savage, S. et al., "Eraser: A Dynamic Data Race Detector for Multithreaded Programs", *ACM Transactions on Computer Systems*, Nov. 1997, 15(4), 391-411.

von Praun, C. et al., "Object Race Detection", *OOPSLA*, 2001, 70-82.

Yu, Y. et al., "RaceTrack: Race Detection for Managed Code", *Presentation at Microsoft TechFest*, Mar. 3-4, 2004, 39 pages.

Nishiyama, H., "Detecting Data Races using Dynamic Escape Analysis based on Read Barrier", *Proceedings of the Third Virtual Machine Research and Technology Symposium*, May 6-7, 2004, 13 pages.

* cited by examiner

SYSTEMS AND METHODS OF REPORTING MULTIPLE THREADS INVOLVED IN A POTENTIAL DATA RACE

FIELD OF THE INVENTION

The present invention relates generally to software. More specifically, reporting multiple threads involved in potential data races is described.

BACKGROUND OF THE INVENTION

A data race is a type of problem that may occur in multithreaded programs or multiple programs accessing the same data which may lead to anomalous behavior of the program(s). Data races may occur where a shared variable can be accessed by various threads/programs simultaneously. Threads/programs "race" to access a shared variable and, depending upon which access occurs first, program results may vary unpredictably. Conventional solutions to this problem attempt to detect data races before they occur. This is partially due to the fact that data races are unpredictable and thus extremely difficult to reproduce during the debugging process. Indeed, any anomalous behavior caused by a data race is dependent on the precise timing of separate threads/programs accessing the same memory location and may thus disappear if that timing is altered during the debugging process.

Conventional solutions for data race detection monitor lock acquisition and memory accesses, computing an access pattern for each memory location and memory access. These solutions then evaluate the access pattern to memory locations to detect suspicious access patterns that may indicate a potential data race. An access pattern is "suspicious" if a memory location is shared among multiple threads without a common lock that may be used by individual threads/programs to govern access to the memory locations. Locks may be used to prevent data races from occurring where suspicious activity is detected.

A lock is a software construct that enables at most one thread/program to access a shared variable at a certain point in time. A locking discipline (i.e., a way of using of a lock) may require that a lock for a shared variable must be acquired before accessing the shared variable. Once a thread/program has completed its access to the shared variable, the lock is released. Locks are "acquired and released," enabling only one thread to access a particular shared variable at any given time. Locks and locking disciplines typically follow an access pattern.

Current methods used for detecting potential data races in a multithreaded program include running the program while monitoring lock acquisition and memory accesses, computing an access pattern for each location in memory, and on each memory access evaluating the accessed location's access pattern to determine if it is suspicious. When a memory access to a location results in the discovery of a suspicious access pattern, the stack of the offending thread is dumped so that a potential data race can be diagnosed. Because a suspicious access pattern might be a false alarm, conventional techniques continue to run the program in order to make further discoveries. However, in order not to overwhelm the user with redundant information, conventional techniques suppress all stack dumps after the first for each location, thus limiting the developer's ability to understand the race condition and how to fix it.

Based on the idea of locksets, "Eraser" (described in, for example, Savage et al., "Eraser: A Dynamic Data Race Detector For Multithreaded Programs," 15 ACM Trans. Comp. Sys. 391-411 (1997), incorporated herein by reference) was the first implementation of a method for detecting potential data races in a multithreaded program by running the program while monitoring lock acquisition and memory accesses, computing an access pattern for each location in memory, and on each memory access evaluating the accessed location's access pattern to determine if it is suspicious. An access pattern is suspicious when it indicates that (a) the location is shared among threads, (b) there is no common lock held by all accesses, and (c) at least one of the accesses is a write. This method has also been implemented for programs written in Java and for programs written using the Rotor CLI. The latter implementation is called "RaceTrack" and its authors include the present inventors.

Figure 1:
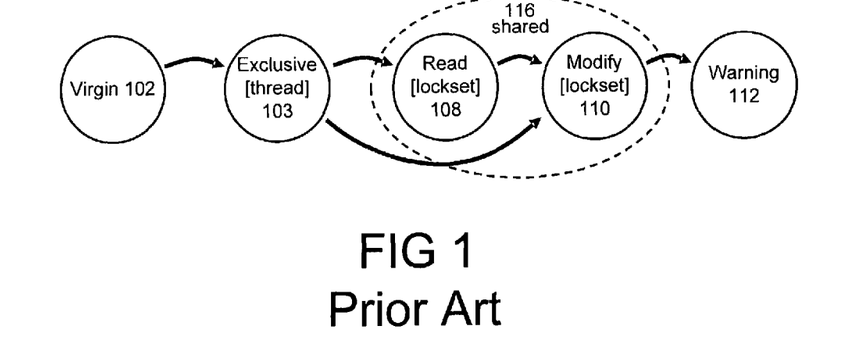
FIG. 1 is an illustration of a conventional access pattern state diagram.

The Eraser access pattern method adds one state word for each memory location that is potentially shared among threads. The state word encodes the state of the currently computed access pattern for its memory location. FIG. 1 illustrates a state diagram for the Eraser access pattern method. Each location starts out in "virgin" state 102, then moves to an "exclusive" state 103 when a thread first accesses the location, then to a "shared" state 116 when additional threads access the location. The "shared" state 116 is subdivided into "shared read" 108 and "shared modify" 110 depending on whether all shared accesses are reads or if any are writes.

In the "exclusive" state 103, the access pattern identifies the thread that is exercising exclusive access, in order to detect when a different thread accesses the location and thus changes its state to "shared" 116. In the "shared" state 116, the access pattern identifies the set of locks that all shared accesses have held in common. Because a set of locks could potentially be a large amount of information to describe, what Eraser actually stores in the state word is an index into a lockset table of an entry that describes the set of locks. Because the number of different locksets used is far fewer than the number of different locations accessed, the use of an index into a table may be a good storage compression technique.

The set of locks identified by any particular "shared" state access pattern can only shrink over time, as further accesses occur. A "shared modify" access pattern with an empty lockset is suspicious. When an access causes an access pattern to first become suspicious, the stack of the offending access is dumped, and the location state is changed to a "warning" state 112. Once the location state is in the "warning" state 112, no further stack dumps are given. Although logically the "warning" state 112 is a separate state, Eraser and RaceTrack actually interpret a "shared modify" state with an empty lockset as the "warning" state instead of representing it explicitly.

Figure 2:
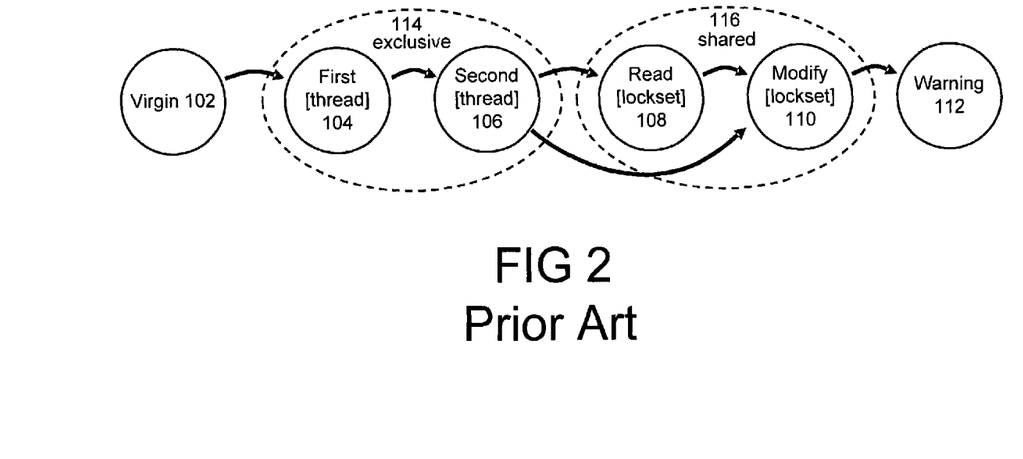
FIG. 2 is an illustration of another conventional access pattern state diagram.

FIG. 2 illustrates a state diagram which is used by RaceTrack as well as other prior art. FIG. 2 is similar to FIG. 1, except that the "exclusive" state 114 is subdivided into exclusive access by a first thread 104 and then exclusive access by a second thread 106. This modification is needed in order to prevent generating a false alarm for a common multithreaded, object-oriented programming paradigm in which the first thread initializes an object and then hands it over to a second, newly-created thread with no sharing intended. Only when the assumption of exclusive access by the second thread is proven wrong is the state changed to "shared".

Figure 3:
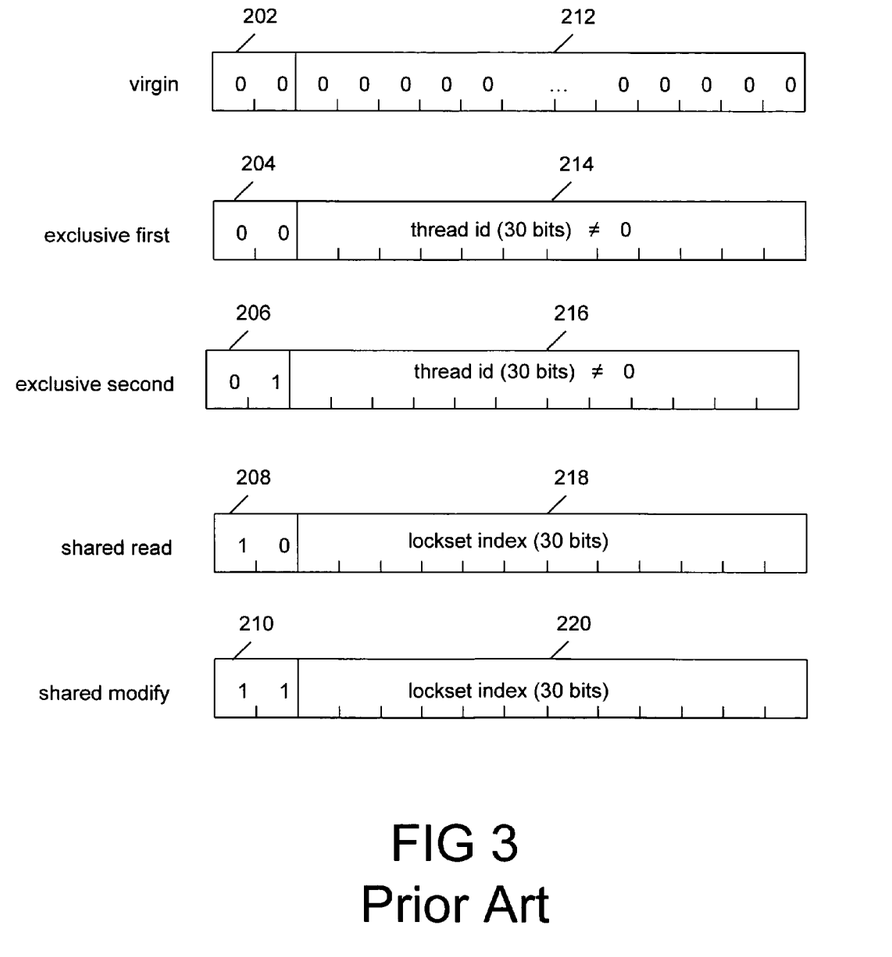
FIG. 3 illustrates conventional state word encoding of access patterns.

In each state except "virgin", some additional information must be stored: in an "exclusive" state it is the identity of the thread exercising exclusive access, in a "shared" state it is the set of common locks. In order to store the access pattern in one word, a few bits are used to encode the state and the remaining bits are used to store a thread identifier or a lockset index. FIG. 3 shows an example of how the RaceTrack access pattern states can be encoded into a 32-bit word.

More particularly, FIG. 2 illustrates a conventional access pattern state diagram. Here, a series of states 102-112 and "superstates" 114-116 are described to illustrate conventional techniques for detecting potential data races. "Exclusive" describes those states where only one thread/program may access a variable at any given time. "Shared" refers to variables that may be accessed simultaneously by multiple threads/programs, unless one of the threads/programs is performing a write operation, which indicates a suspicious pattern (i.e., a potential data race). States 102-112 represent a particular state of an item during an access. Each item is initially in a "virgin" state 102, then moves to an exclusive first state 104 when a thread in a multi-threaded program (or a program) first accesses the item. When a second thread/program accesses the item (previously accessed by the first thread/program), the item moves to an exclusive second state 106. The separation of exclusive superstate 114 into an exclusive first state 104 and an exclusive second state 106 prevents generation of a false alarm. If a program is designed to allow a first thread/program to initialize an object, handing it over to a second thread/program without ever performing any simultaneous shared access, a false alarm indicating a potential data race may be generated.

When a different thread accesses an item in exclusive second state 106, the item moves to shared superstate 116. If the access is a read operation ("read"), then the item enters shared read state 108. In the event that the access is a write operation ("write"), the item enters shared modify state 110. This is an example of a "first shared" access. Subsequent accesses are also referred to as "shared" accesses. Also, if the shared access is a write and the item is in shared read state 108, the item moves to shared modify state 110. Entering a shared state (e.g., shared read state 108 or shared modify state 110) also initiates computation of a set of locks ("lockset") that are common to shared accesses to an item. The first lockset is set to the set of locks held by the accessing thread when the first shared access occurs. On every subsequent shared access, the item's lockset is reduced to the intersection of its lockset and the set of locks held by the accessing thread.

An access pattern's lockset can only decrease over time, as subsequent accesses occur. However, a shared modify access pattern with an empty lockset indicates a suspicious pattern. When a suspicious access pattern is first detected, conventional implementations generate a warning (e.g., warning state 112) of a potential data race. Typically, when a warning of a potential data race is generated, the stack of the thread associated with the suspicious pattern is dumped, enabling a user to diagnose a copy of the thread whether a potential data race exists while still permitting the program to run. A "warning" state 112 is entered if suspicious patterns are detected.

FIG. 3 illustrates conventional encoding of access patterns. As an example, conventional techniques encode information relevant to access patterns using 32-bit words that include state information. In each state, except virgin state 102, information in addition to the state name must be stored. In an exclusive state (e.g., exclusive states 104-106), an identifier for a thread exercising exclusive access is stored. In a shared state (e.g., shared states 108-110) a set of common locks is stored. In order to store an access pattern in one word, typically a few bits (e.g., bits 202-210) are used to encode the state name. Fields 212-220 are used to store remaining bits for a thread identifier or an index in a table of locksets.

Having a stack dump of one access is often sufficient to draw attention to the relevant source code, for which a careful examination can reveal whether the suspicious access pattern represents a true race or just a false alarm. However, it would be useful to have stack dumps for other accesses to such a location, provided that the additional stack dumps were selected so as to likely contain significant additional information about the causes of the suspicious access pattern. The problem is how to select which other stack dumps to give. If the selection is too liberal, too many stack dumps will be given containing little additional information and the result will not be useful. If the selection is too conservative—as in the prior art, which gives no additional stack dumps at all—no additional information is revealed. It would be further desirable that this selection is on-line as the program runs.

Thus, what are needed are systems and methods that overcome the limitations and drawbacks of conventional techniques.

SUMMARY OF THE INVENTION

This present invention is directed to improving access-pattern systems and methods to make it easier to diagnose potential data races.

The present invention defines criteria for determining when additional stack dumps would be saved and presented (e.g., to the developer), providing more information for the developer to use for debugging, and yet not overburdening the developer with irrelevant information.

According to aspects of the present invention, suspicious activity worthy of an additional stack dumps may be defined as a thread accessing an already suspicious location that is different than the original thread, a write access being made and no write access having yet been made to the target location, or if the lockset being held by the thread accessing the location is omitted from the intersection of all locksets involved in stack dumps for the location.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE PREFERRED EMBODIMENTS

The invention can be implemented in numerous ways, including as a process, an apparatus, a system, a computer-readable medium such as a computer-readable storage medium or a computer network wherein program instructions are sent over optical or electronic communication links. In general, the steps of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

If threads perform accesses that create a suspicious access pattern on a location, then the threads will likely perform further accesses that follow the same pattern on that location. Therefore, once a suspicious access pattern has been discovered, each subsequent access to that location can be examined closely to determine if it provides additional information likely to help illustrate why the access pattern is suspicious.

Note that it would be undesirable to give a stack dump for each subsequent access, because this would result in far too many stack dumps with little additional information. Desirably, an additional stack dump should be given only in those cases where it would be likely to provide significant additional information.

An alternative approach would be to save stack dumps for all accesses to a location starting with the access that first caused the suspicious access pattern to be discovered. Then at a later time it could be determined which stack dumps would be most useful to give. This alternative approach allows an off-line determination but it requires many stack dumps to be created and saved while the program runs. An exemplary approach is to determine whether or not to give a stack dump at the time the access is made. This on-line determination only creates stack dumps that are actually desired and does not require any stack dumps to be saved.

Several example criteria may be relevant to determining whether or not a subsequent stack dump would likely be useful. One example criterion is if the thread making the subsequent access has not yet been involved in a stack dump for this location, then a stack dump would likely be useful. Another example criterion is that if the subsequent access is a write access and no write access has been involved in a stack dump for this location, then a stack dump would likely be useful. Another example criterion is that if the lock set held by the subsequent access omits a lock from the intersection of all lock sets involved in stack dumps for this location, then a stack dump would likely be useful. Additional criteria may also be used alone or in combination.

Several example embodiments are described which vary in details of techniques of determining which additional stack dumps to give and in how to encode the state information used to make such a determination.

Figure 4:
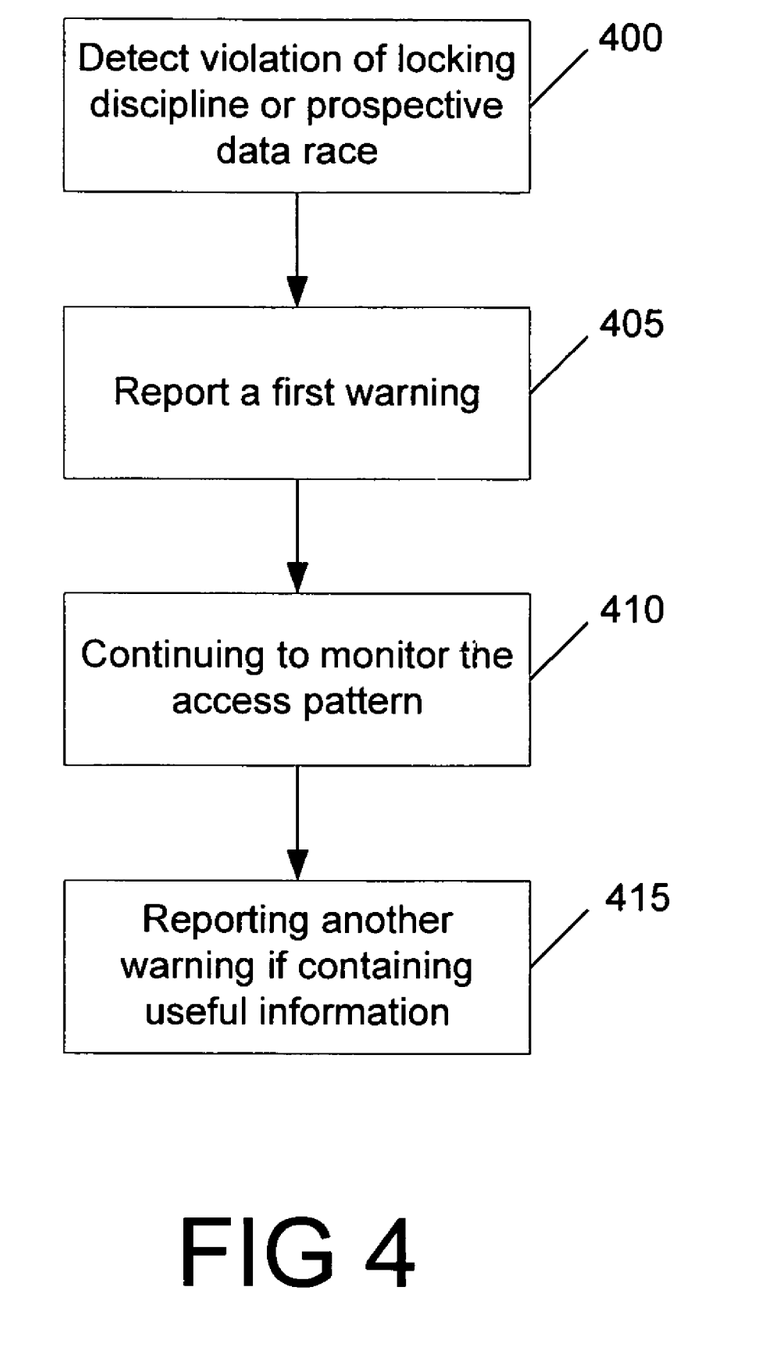
FIG. 4 is a flow chart illustrating an exemplary process for reporting warnings in accordance with the present invention.

FIG. 4 is a flow chart illustrating an exemplary process for reporting warnings in accordance with the present invention. At step 400, it is determined if a violation of a locking discipline or a prospective data race has occurred. If so, then at step 405, a warning is reported. The monitoring for a subsequent violation continues at step 410. Certain predetermined criteria, as described further herein, may be considered in determining whether a subsequent violation occurs. At step 415, if a subsequent violation meets one of the predetermined criteria, then it is determined that useful information may be determined from a subsequent warning, and a subsequent warning is reported. Thus, additional warnings may be provided on subsequent accesses.

Figure 5:
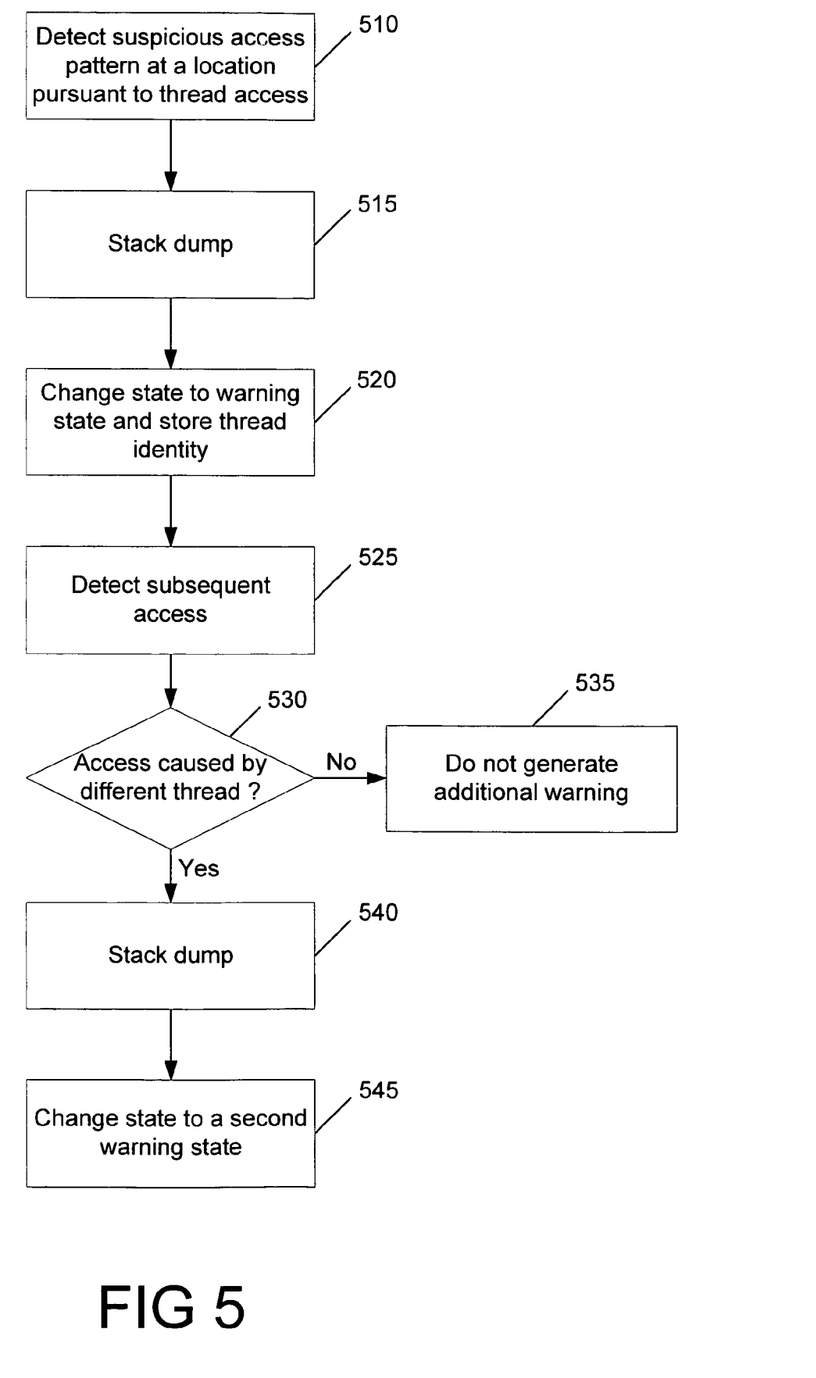
FIG. 5 is a flow chart illustrating another exemplary process for reporting warnings in accordance with the present invention.

FIG. 5 is a flow chart illustrating another exemplary process for reporting warnings in accordance with the present invention. At step 510, a suspicious access pattern is detected at a location pursuant to a thread access. The stack is dumped and a warning is generated, at steps 515 and 520, respectively.

At some point, another access is detected, at step 525. It is then determined, at step 530, if the access was caused by the same thread or a different thread. If the access was caused by the same thread, then an additional warning is not generated, at step 535, because it is likely that no additional useful information could be provided by, or obtained from, such a warning. If the access was caused by a different thread, then the stack is dumped at step 540 and another warning is generated at step 545. This additional warning is likely to provide additional useful information about the access and/or violation.

Figure 6:
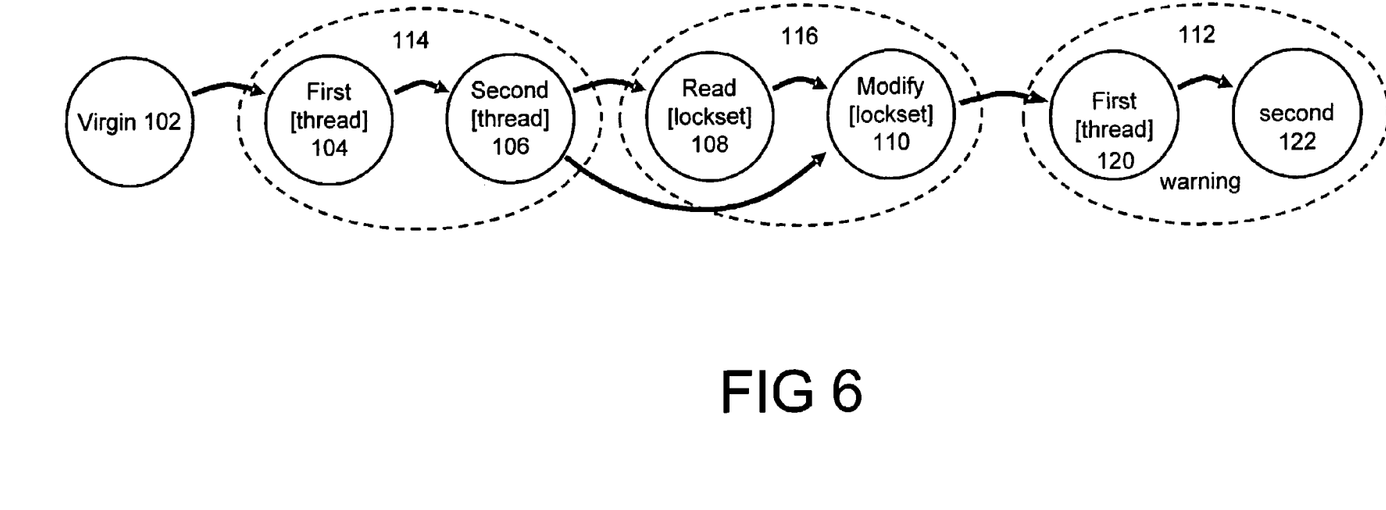
FIG. 6 illustrates an exemplary access pattern state diagram with reporting of the second thread involved in a potential data race in accordance with the present invention.

In accordance with an embodiment of this invention, FIG. 6 illustrates an access pattern state diagram that divides the "warning" state 112 into a "warning first" state 120 and a "warning second" state 122. When an access occurs that causes the discovery of a suspicious access pattern, namely the first access that results in a shared-modify empty lockset state, a stack dump is given and then the location state is changed to a "warning first" state 120. The "warning first" state 120 also stores the identity of the thread whose access caused the warning. In the "warning first" state 120, subsequent accesses by the same thread do not produce any warning, but if a different thread accesses the location, then a stack dump is given and the location state is changed to a "warning second" state 122. In the "warning second" state 122, no further stack dumps are given. Note that this embodiment employs a criterion directed to giving stack dumps for different threads, subject to the limitation of considering only the first two threads. It is contemplated that more than two threads may be considered in accordance with the present invention.

Figure 7:
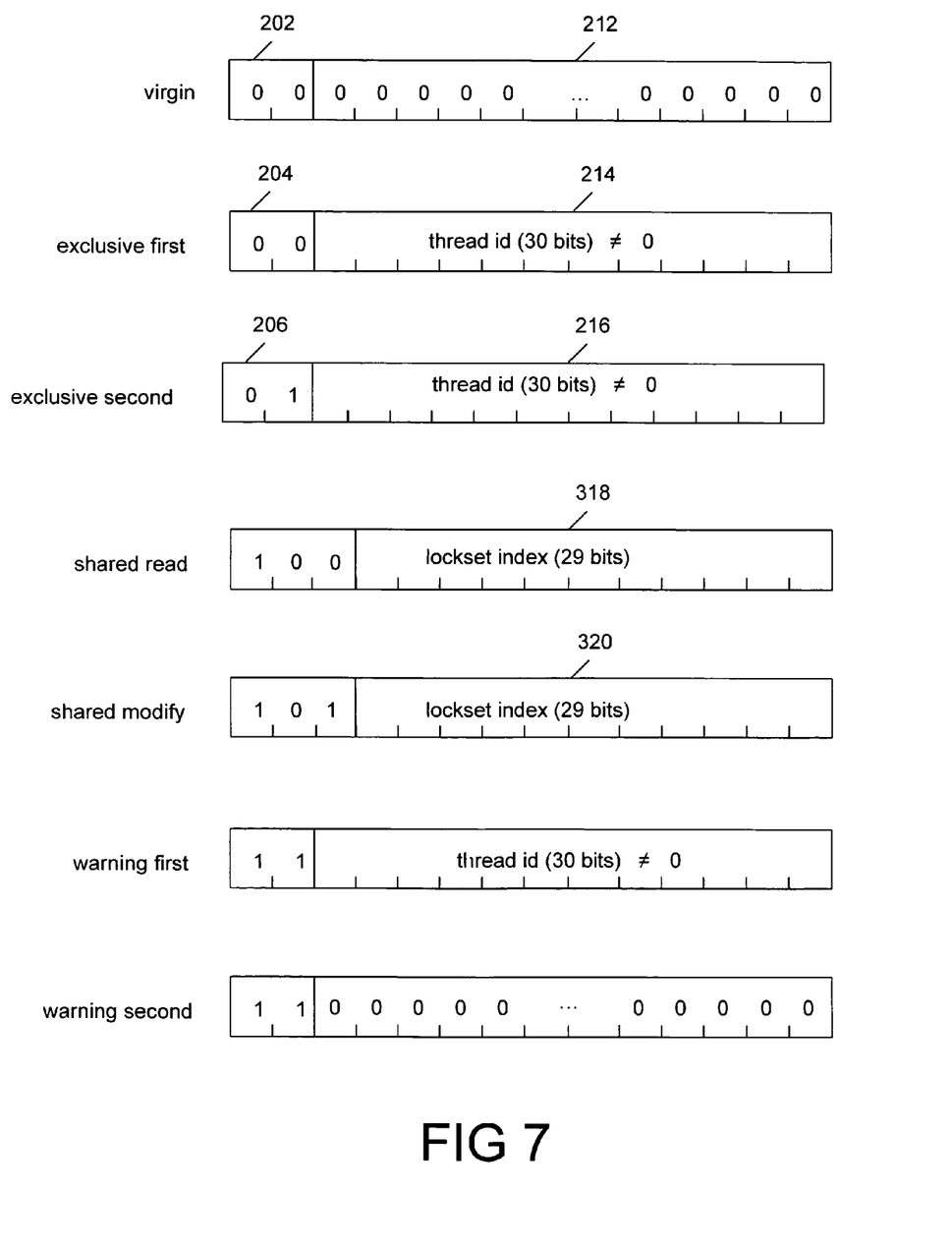
FIG. 7 illustrates example state word encoding for the access pattern state diagram of FIG. 6.

FIG. 7 shows an example of how the access pattern states for this embodiment can be encoded into a 32-bit word. Note that compared with prior art (FIG. 3), this encoding provides the same number of bits for storing a thread identifier, while reducing the storage for a lockset index from 30 bits to 29 bits (elements 318 and 320). This reduction is acceptable because in practice the number of different locksets used by a program is far, far fewer than $2^{29}$.

Figure 8:
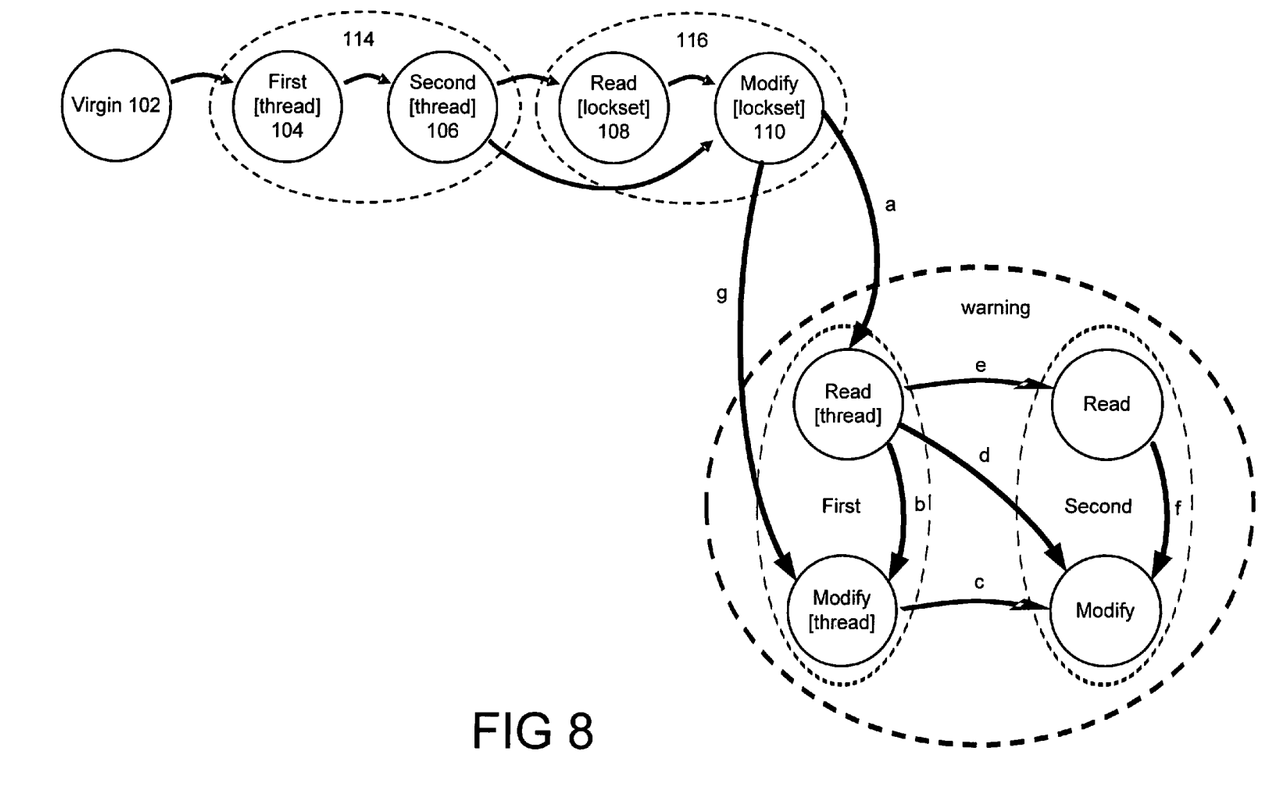
FIG. 8 illustrates an exemplary access pattern state diagram with reporting of two or three threads involved in a potential data race, including at least one write access in accordance with the present invention.

In accordance with another embodiment of this invention, the "warning first" and "warning second" states can be subdivided according to whether all warnings for the location have been issued on read accesses ("read") or at least one warning has been issued on a write access ("modify"), as illustrated in FIG. 8. In this embodiment, when a stack dump is given on a read access, arc a is followed, changing the location state to a "warning first read" state and storing the identity of the thread whose access caused the warning.

A subsequent write access by the same thread causes an additional stack dump to be given and arc b to be followed, changing the location state to a "warning first modify" state with the same thread identity stored. Then a subsequent read or write access by a different thread causes an additional stack dump to be given and arc c to be followed, changing the location state to a "warning second modify" state, whereafter no further stack dumps will be given for the location. In the "warning first read" state, a subsequent write access by a different thread causes an additional stack dump to be given and arc d to be followed, also changing the location state to a "warning second modify" state.

In the "warning first read" state, a subsequent read access by a different thread causes an additional stack dump to be given and arc e to be followed, changing the location state to a "warning second read" state. Then a subsequent write access by any thread causes an additional stack dump to be given and arc f to be followed, changing the location state to a "warning second modify" state. Finally, when a stack dump is given as in prior art on a write access, arc g is followed, changing the location state to a "warning first modify" state.

In summary, a stack dump is given whenever any of the labeled arcs a, b, c, d, e, f or g is followed. Minor variations on these states and transitions are possible, such as omitting the "warning second read" state. Note that this embodiment employs the criteria: give stack dumps for different threads, and give some stack dump for a write access, subject to a limitation in the number of threads considered.

Figure 9:
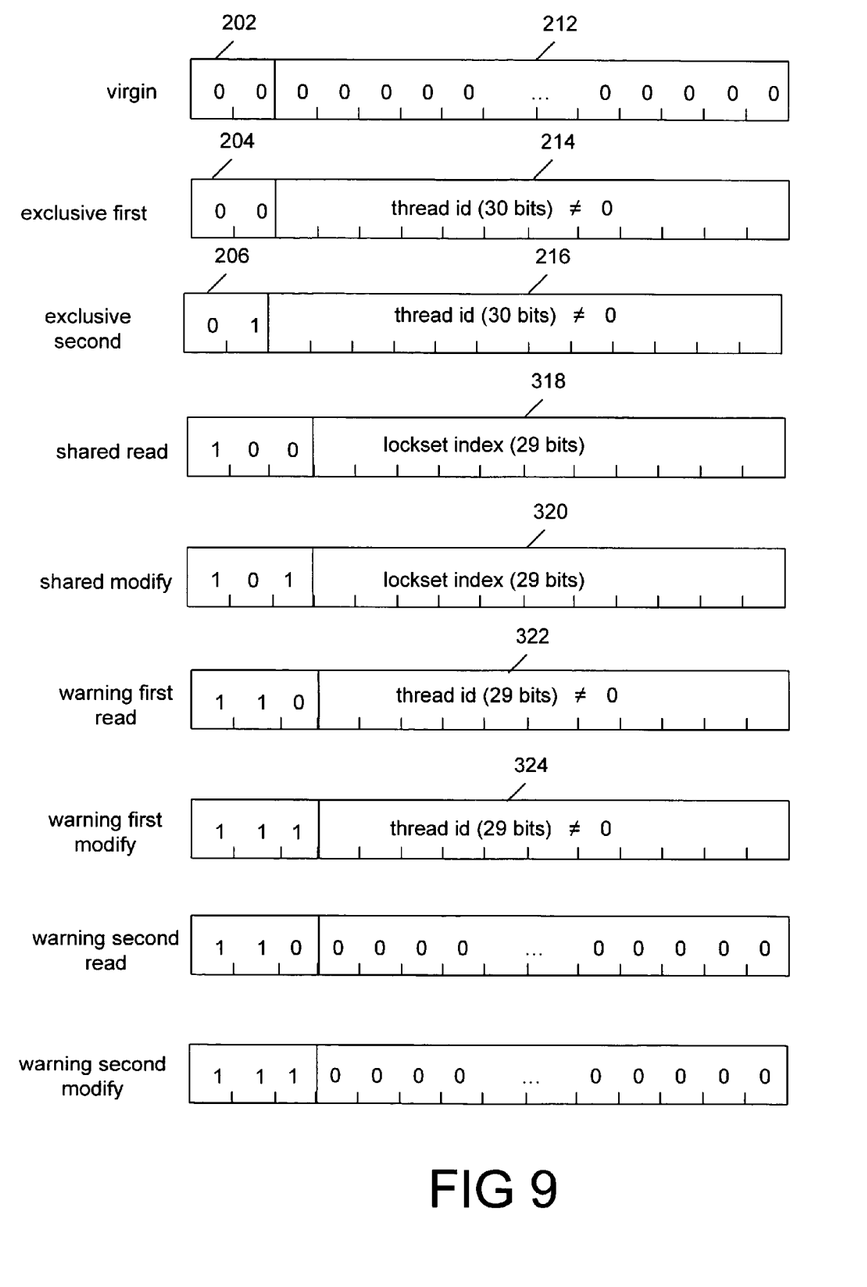
FIG. 9 illustrates example state word encoding for the access pattern state diagram of FIG. 8.

FIG. 9 shows an example of how the access pattern states for this embodiment can be encoded into a 32-bit word. Note that this example uses a thread identity that is stored in 29 bits (322, 324).

Figure 10:
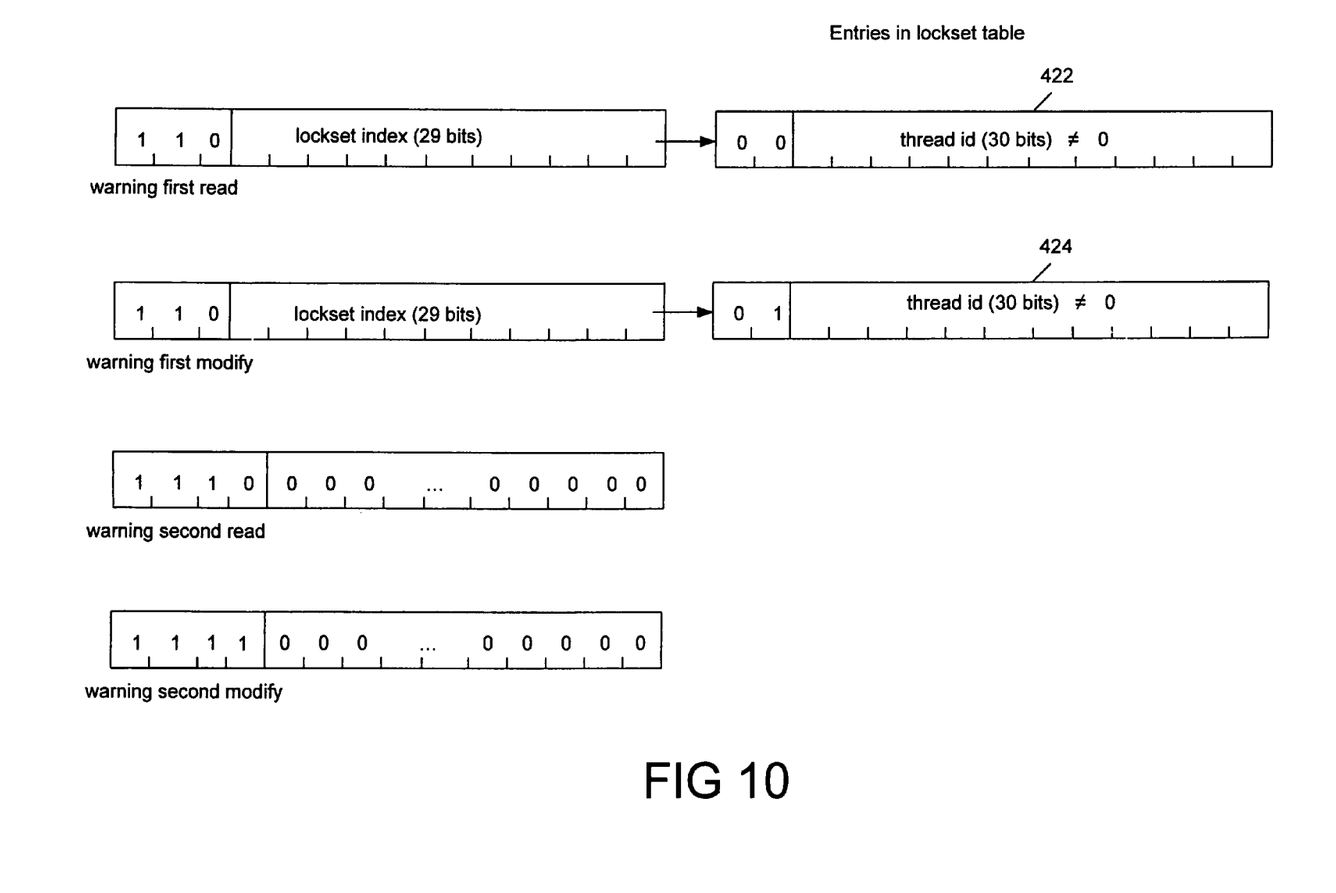
FIG. 10 illustrates another example state word encoding for the access pattern state diagram of FIG. 8, exploiting the lockset table to get additional storage for warning states in accordance with the present invention.

FIG. 10 shows another example of how the access pattern states for this embodiment can be encoded. This example is based on the observation that the lockset table can be exploited to obtain additional storage. In this example, the "warning first" states do not store their associated thread id in the state word. Instead, an entry is appropriated from the lockset table for this purpose and the lockset index of this entry is stored in the state word. By this means, 30 bits can still be provided to store a thread id (422, 424). Because the total number of stack dumps given ought to be small in comparison to the number of distinct locksets, the additional demand on the lockset table created by this approach should be negligible.

Figure 11:
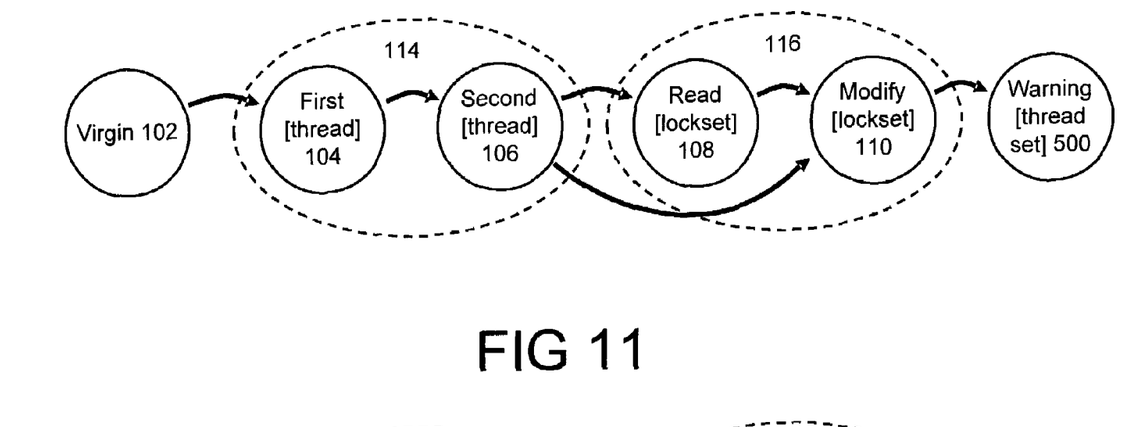
FIG. 11 illustrates an exemplary access pattern state diagram with reporting of multiple threads involved in a potential data race in accordance with the present invention.

In accordance with another embodiment of the invention, the "warning" state can be generalized to describe a set of threads, as illustrated in FIG. 11. In this embodiment, a "warning" state 500 stores the identity of all threads for which a stack dump has been given for an access on the location. On each subsequent access, the threadset is examined to see if the accessing thread has already participated in a stack dump. If so, no stack dump is given. Otherwise, a stack dump is given and the thread is added to the set. Because the amount of information used to describe a threadset is potentially large, space will have to be appropriated from somewhere. One solution is to appropriate space from the lockset table. Note that this embodiment employs a criterion directed to giving stack dumps for different threads.

Figure 12:
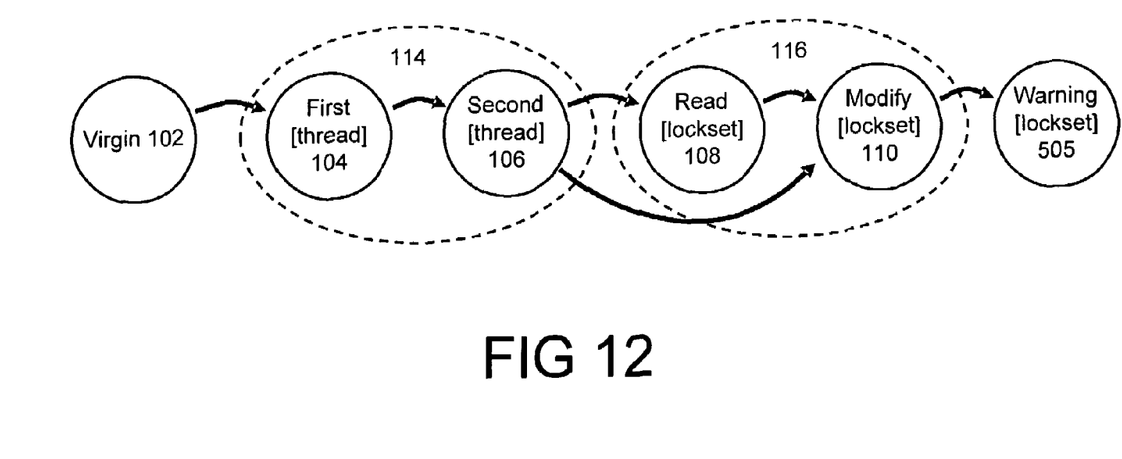
FIG. 12 illustrates an exemplary access pattern state diagram with reporting of accesses that shrink the common lockset, for a location involved in a potential data race in accordance with the present invention.

In accordance with another embodiment of this invention, the "warning" state can be generalized to describe a common lockset, as illustrated in FIG. 12. In this embodiment, a "warning" state 505 stores the set of locks held in common by all accesses for which a stack dump has been given. When a suspicious access pattern is discovered, a stack dump is given as in prior art and the state is changed to a "warning" state with the lockset initialized to the lockset of the offending access. On each subsequent access, the intersection of the access's lockset and the "warning" state's lockset is determined. If this intersection is smaller that the "warning" state's lockset, a stack dump is given and the "warning" state's lockset is updated. Note that this embodiment employs a criterion directed to giving stack dumps that shrink the lockset.

Figure 13:
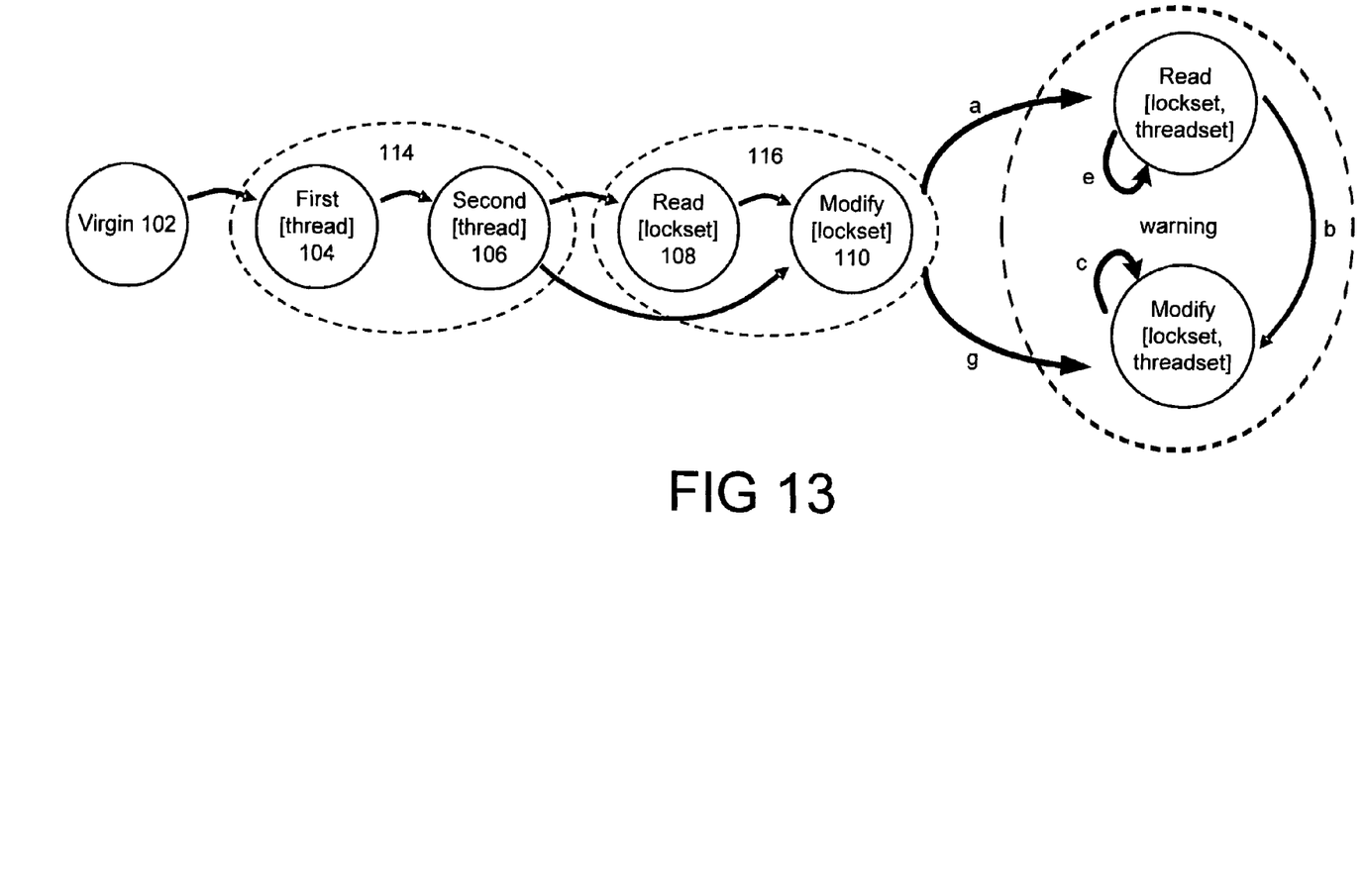
FIG. 13 illustrates an exemplary access pattern state diagram with reporting of multiple threads involved in a potential data race, including at least one write access and accesses that shrink the common lockset in accordance with the present invention.

The various described embodiments may be hybridized so as to employ any desired combination of the criteria described herein, or other criteria. For example, a hybrid of various examples described herein is illustrated in FIG. 13.

Exemplary Computing Environment

Figure 14:
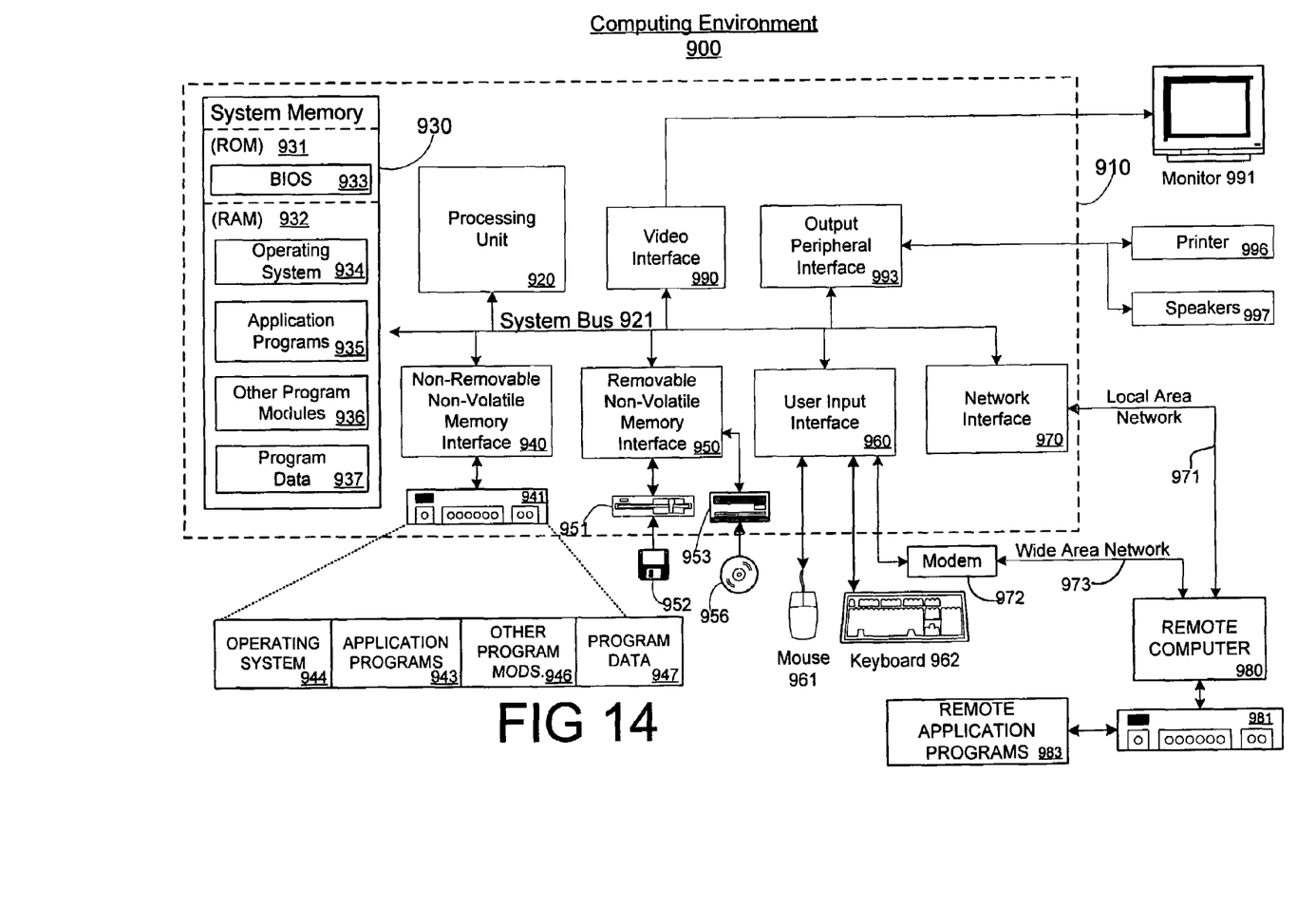
FIG. 14 is a block diagram showing an exemplary computing environment in which aspects of the invention may be implemented.

FIG. 14 illustrates an example of a suitable computing system environment 900 in which the invention may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 14, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 910 typically includes a variety of computer readable media. Computer readable media can be any available media that can be accessed by computer 910 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or non-volatile memory such as ROM 931 and RAM 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 14 illustrates operating system 934, application programs 935, other program modules 936, and program data 937.

The computer 910 may also include other removable/non-removable, volatile/non-volatile computer storage media. By way of example only, FIG. 14 illustrates a hard disk drive 941 that reads from or writes to non-removable, non-volatile magnetic media, a magnetic disk drive 951 that reads from or writes to a removable, non-volatile magnetic disk 952, and an optical disk drive 953 that reads from or writes to a removable, non-volatile optical disk 956, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 953 are typically connected to the system bus 921 by a removable memory interface, such as interface 950.

The drives and their associated computer storage media provide storage of computer readable instructions, data structures, program modules and other data for the computer 910. In FIG. 14, for example, hard disk drive 941 is illustrated as storing operating system 944, application programs 943, other program modules 946, and program data 947. Note that these components can either be the same as or different from operating system 934, application programs 935, other program modules 936, and program data 937. Operating system 944, application programs 943, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 993.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 14. The logical connections depicted include a LAN 971 and a WAN 973, but may also include other networks. Such networking environments are commonplace in offices, enterprise-wide computer networks, intranets and the internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 14 illustrates remote application programs 983 as residing on memory device 981. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method of reporting a warning involving a prospective data race among a plurality of threads of a multithreaded computer program, comprising:
   monitoring lock acquisition and memory accesses to a memory location and computing a memory access pattern for each memory access;
   determining whether a memory access to the location by a thread results in a suspicious memory access pattern for the location and, if so, dumping the stack of the thread
   detecting a subsequent memory access to the location;
   determining if at least one predetermined criterion regarding the subsequent memory access is met; and
   dumping the stack of the thread performing the subsequent memory access if the at least one predetermined criterion is met.

2. The method of claim 1, wherein the at least one predetermined criterion comprises whether the thread making the subsequent access has not yet been involved in a stack dump for the location.

3. The method of claim 1, wherein the subsequent memory access comprises a write access for a location, and wherein the at least one predetermined criterion comprises no write access has been involved in a stack dump for the location.

4. The method of claim 1, wherein the at least one predetermined criterion comprises a lock set associated with the subsequent memory access omits a lock from the intersection of all lock sets involved in stack dumps for the location.

5. The method of claim 1, further comprising issuing a warning if a suspicious memory access pattern is detected.

6. The method of claim 1, further comprising setting the state of the location to a warning state after detecting the suspicious access pattern.

7. The method of claim 6, further comprising storing an identity of the thread whose memory access resulted in the suspicious access pattern.

8. The method of claim 6, further comprising setting the state of the location to a second warning state if the subsequent memory access is by a different thread.

9. The method of claim 8, further comprising storing an identity of the different thread.

10. The method of claim 8, further comprising reporting a warning pursuant to the second warning state.

11. The method of claim 10, wherein the warning comprises information about the subsequent memory access.

12. A computer-readable storage medium with computer-executable instructions stored thereon, the instructions, when executed by a computer, causing the computer to perform the steps of:
   monitoring lock acquisition and memory accesses to a memory location and computing a memory access pattern for each memory access;
   determining whether a memory access to the location by a thread results in a suspicious memory access pattern for the location and, if so, dumping the stack of the thread;
   detecting a subsequent memory access to the location;
   determining if at least one predetermined criterion regarding the subsequent memory access is met; and
   dumping the stack of the thread performing the subsequent memory access if the at least one predetermined criterion is met.

13. The computer-readable storage medium of claim 12, wherein the suspicious memory access pattern is related to a prospective data race.

14. The computer-readable storage medium of claim 12, wherein the at least one predetermined criterion comprises whether the thread making the subsequent access has not yet been involved in a stack dump for the location.

15. The computer-readable storage medium of claim 12, wherein the subsequent memory access comprises a write access for a location, and wherein the at least one predetermined criterion comprises no write access has been involved in a stack dump for the location.

16. The computer-readable storage medium of claim 12, wherein the at least one predetermined criterion comprises a lock set associated with the subsequent memory access omits a lock from the intersection of all lock sets involved in stack dumps for the location.

17. The computer-readable storage medium of claim 12, wherein the instructions further cause the computer to set the state of the location to a warning state after detecting the suspicious access pattern.

18. The computer-readable storage medium of claim 17, wherein the instructions further cause the computer to store an identity of the thread whose memory access resulted in the suspicious access pattern.

19. The computer-readable storage medium of claim 17, wherein the instructions further cause the computer to set the state of the location to a second warning state if the subsequent memory access is by a different thread.

20. The computer-readable storage medium of claim 19, wherein the instructions further cause the computer to store an identity of the different thread.

* * * * *